No. 875,657. PATENTED DEC. 31, 1907.
W. N. DURANT.
LUBRICATOR.
APPLICATION FILED SEPT. 20, 1905.
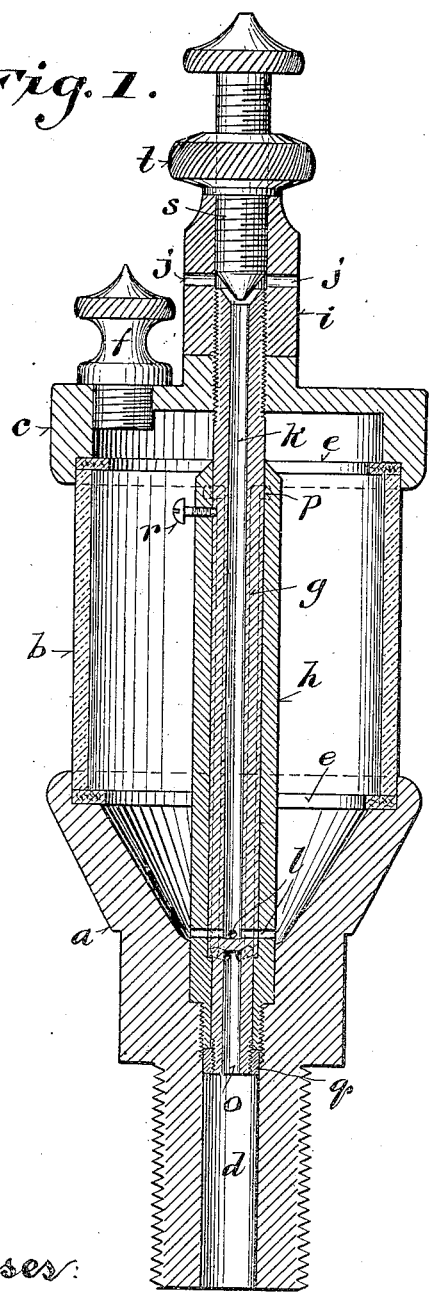
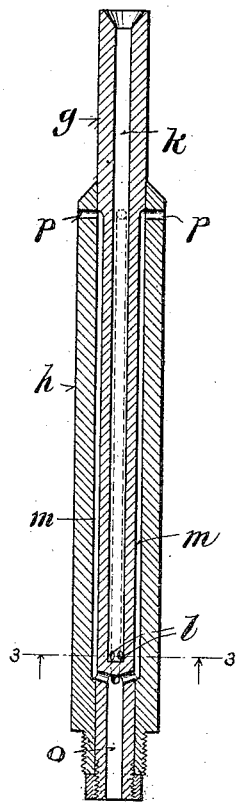
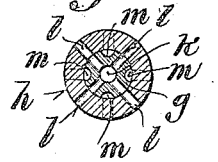
Witnesses:
Fred Palm.
Chas. L. Goss.
Inventor:
Walter N. Durant,
By Winkler, Flanders, Smith, Bottum & Fawsett
Attorneys.

UNITED STATES PATENT OFFICE.

WALTER N. DURANT, OF LOS ANGELES, CALIFORNIA.

LUBRICATOR.

No. 875,657.　　　Specification of Letters Patent.　　　Patented Dec. 31, 1907.

Application filed September 20, 1905. Serial No. 279,227.

*To all whom it may concern:*

Be it known that I, WALTER N. DURANT, a citizen of the United States, residing at Los Angeles, Los Angeles county, California, have invented certain new and useful Improvements in Lubricators, of which the following is a specification, reference being had to the accompanying drawing, forming a part thereof.

The main objects of this invention are to automatically feed a lubricant in a dry powdered state into the cylinder of internal combustion engines and compressors, or to other bearings, and to regulate the supply of such lubricant.

It consists in certain novel features of construction and in the peculiar arrangement and combinations of parts as hereinafter particularly described and pointed out in the claims.

In the accompanying drawing, which illustrates one of various forms in which the invention may be embodied, like characters designate the same parts in the several figures.

Figure 1 is a vertical central section of the lubricator; Fig. 2 is a similar section in a plane at right angles to that of Fig. 1 of the tube and sleeve forming the air inlet and the air and lubricant outlet passages into and out of the lubricant receptacle, and Fig. 3 is a cross section on the line 3 3, Fig. 2.

The lubricator has a closed lubricant receptacle which may be conveniently constructed, as shown, of a metal base $a$, a cylindrical glass body $b$, and a metal cover $c$. The base is formed with an outlet passage $d$ and on the upper side with an annular recess and shoulder to receive a packing ring $e$ and the lower end of the body $b$. It is also preferably formed, as shown, with a conical cavity which forms the bottom of the lubricant chamber, and may be formed with a screw-threaded neck, as shown, for attaching it to the cylinder of an engine, compressor or other machine.

The cap $c$ is formed with an annular recess and shoulder to receive another packing ring $e$ and the upper end of the body $b$. It is also preferably formed with a filling opening and provided with a screw-threaded plug or stopper $f$ for closing said opening.

A tube $g$ fitted in a sleeve $h$ which is threaded or otherwise secured at its lower end in the base $a$, passes through the cover $c$ and is provided at its protruding end, which is threaded, with a nut $i$. The nut is formed with one or more lateral air intake openings $j$ communicating with the upper end of said tube which has a longitudinal bore $k$ extending from its upper end to lateral openings $l$ into the lower part of the lubricant chamber, external longitudinal grooves $m$, and a longitudinal bore $o$ communicating at its upper end through lateral openings with the lower ends of said grooves, and opening at its lower end into the outlet passage $d$ in the base. The lateral openings $l$ extend through both the tube $g$ and the surrounding sleeve $h$, which is formed at or near its upper end with lateral openings $p$ registering with the upper ends of the grooves $m$. The lower end of the tube $g$ is reduced in size and formed below the grooves $m$ with a shoulder which fits against a corresponding inwardly projecting shoulder in the sleeve $h$. A nut $q$ threaded on the lower end of said tube holds it in the sleeve $h$ against the pull of the nut $i$ when the latter is screwed down on the cover. The proper relative position of the sleeve $h$ with reference to the tube $g$, so that the lateral openings $l$ and $p$ in said sleeve will register with the corresponding openings $l$ and the upper ends of the groove $m$ in said tube, is determined by a screw $r$ which is threaded in said sleeve and engages at its tip with a socket in the tube, as shown in Fig. 1. The bore $k$ of the tube, with the air intake openings $j$ in the nut $i$ and the lateral openings $l$, constitute the air inlet passage of the lubricator, and the grooves $m$ in the outer face of said tube with the inclosing sleeve $h$, the lateral openings $p$ therein, the bore $o$ communicating with the lower ends of said grooves, and the passage $d$, constitute the air and lubricant delivery or outlet passage of the lubricator.

A valve $s$ having its stem threaded in a continuation of the bore of the nut $i$ above the upper end of the tube $g$, controls and serves to regulate the supply of air admitted into said tube. The valve is provided with a head at the upper end of its stem for adjusting it, and with a jamb nut $t$ for locking it to the nut $i$ and holding it in adjusted position.

The operation of the lubricator constructed as herein shown and described and as applied, for example, to the cylinder of an internal combustion engine, may be explained as follows: The lubricant chamber being filled or supplied with a lubricant such, for instance, as graphite in a dry, powdered state, and closed except as to the inlet and outlet passages, with each suction stroke of the engine piston, air is drawn through the inlet passage k into the lower part of the lubricant chamber in which it passes upward through the lubricant contained therein, taking up and carrying with it some of the lubricant into and through the outlet passage leading from the upper part of said chamber into the engine cylinder, where the lubricant is deposited upon the moist walls of the piston and cylinder. The amount of air admitted into the lubricant receptacle and hence the quantity of lubricant entrained therewith into the cylinder, is regulated by the adjustment of the valve s, and the proper adjustment of the valve is determined by observation of the action or effect of the air on the lubricant which is visible through the transparent body b of the lubricant receptacle. The tube g and sleeve h constructed and arranged as shown, serve not only to form the inlet and outlet passages of the lubricator, but also to tie and hold the several parts of the lubricant receptacle firmly together, but the inlet and outlet passages may be otherwise constructed and arranged.

I claim:

1. A lubricator comprising a closed lubricant receptacle provided with an air inlet passage leading through the top and having an inlet opening at its upper end outside and an outlet opening at its lower end inside of the receptacle, and an outlet passage leading through the bottom and having an inlet opening at its upper end inside and an outlet opening at its lower end outside of said receptacle, substantially as described.

2. A lubricator comprising a closed lubricant receptacle, a transparent part through which its contents are visible, said receptacle being provided with an air inlet passage leading through the top and having an inlet opening at its upper end outside and an outlet opening at its lower end inside of the receptacle, a regulating valve controlling the supply of air admitted to said receptacle through said passage, and an outlet passage leading through the bottom and having an inlet opening at its upper end inside and an outlet opening at its lower end outside of said receptacle, substantially as described.

3. A lubricator comprising a closed lubricant receptacle having an outlet passage in the base, a tube extending through the top of the receptacle and having a longitudinal bore extending from an air inlet opening at its upper end to a lateral outlet opening into the lower part of said receptacle, a longitudinal groove in its outer face and a longitudinal bore communicating at its upper end with the lower end of said groove and at its lower end with said outlet passage, and a sleeve surrounding said tube and having lateral openings registering inside of said receptacle with the upper end of said groove and with the lateral outlet opening in said tube, substantially as described.

4. A lubricator comprising a closed lubricant receptacle, a transparent part through which its contents are visible, a tube extending through the top of the receptacle and having a longitudinal bore extending from an air inlet opening at its upper end to a lateral outlet opening into the lower part of said receptacle, a longitudinal groove in its outer face and a longitudinal bore communicating at its upper end with the lower end of said groove and at its lower end with said outlet passage, a regulating valve controlling the admission of air into said tube, and a sleeve surrounding said tube and having lateral openings registering inside of said receptacle with the upper end of said groove and with the lateral outlet opening in said tube, substantially as described.

5. A lubricator comprising a lubricant receptacle composed of a base having an outlet passage, a transparent body and a cover, a tube passing through said cover into the outlet passage in the base and having a longitudinal bore leading from an air inlet opening at its upper end to a lateral outlet opening into the lower part of said receptacle, a longitudinal groove in its outer face and a longitudinal bore communicating with the lower end of said groove and leading therefrom into said outlet passage, a sleeve surrounding said tube and secured thereto and to the base and having lateral openings registering with the upper end of said groove and with the lateral outlet opening in said tube, a nut threaded on the upper end of said tube and having a lateral opening communicating therewith, and a regulating valve threaded in said nut and controlling the admission of air into said tube, substantially as described.

In witness whereof I hereto affix my signature in presence of two witnesses.

WALTER N. DURANT.

Witnesses:
   CHAS. L. GOSS,
   THEODORE STEIN.